United States Patent [19]

Finnern

[11] Patent Number: 4,972,592
[45] Date of Patent: Nov. 27, 1990

[54] SEXTANT WITH ADJUSTABLE HANDLE

[75] Inventor: Gerd Finnern, Hamburg, Fed. Rep. of Germany

[73] Assignee: C. Plath Fabrik nautischer Instrumente, Hamburg, Fed. Rep. of Germany

[21] Appl. No.: 299,888

[22] Filed: Jan. 23, 1989

[30] Foreign Application Priority Data

Jan. 20, 1988 [DE] Fed. Rep. of Germany ....... 8800633

[51] Int. Cl.$^5$ .............................................. G01C 1/08
[52] U.S. Cl. ........................................ 33/282; 33/290; 356/144
[58] Field of Search ................. 33/282, 283, 284, 290, 33/292, 280; 356/140, 144

[56] References Cited

U.S. PATENT DOCUMENTS

| | | |
|---|---|---|
| 1,308,971 | 7/1919 | Widen .................................. 33/282 |
| 1,401,380 | 12/1921 | Vaughn ................................. 33/282 |
| 2,378,770 | 6/1945 | Horr ................................. 33/282 X |
| 2,403,919 | 7/1946 | Hagner ................................. 33/282 |
| 2,531,248 | 11/1950 | Belch .................................. 356/144 |
| 3,408,741 | 11/1968 | Bane .................................... 33/284 |
| 3,828,443 | 8/1974 | James .................................. 33/282 |
| 4,245,393 | 1/1981 | Zane et al. ...................... 356/144 X |
| 4,428,671 | 1/1984 | Davies .................................. 356/144 |

Primary Examiner—Daniel M. Yasich
Attorney, Agent, or Firm—Elliott N. Kramsky

[57] ABSTRACT

An optical measuring instrument permits the user to adapt the handle position optimally to his individual wishes and habits while holding the instrument. An adapter is fixed to the limbus body. The adapter includes curved slots for accepting fixing screws that lie within bores of the head part of the handle. By loosening the screws, one may adjust the position of the handle through a preselected angular range, tightening the screws to fix a preferred handle position.

8 Claims, 2 Drawing Sheets

SEXTANT WITH ADJUSTABLE HANDLE

BACKGROUND

1. Field of the Invention

The present invention relates to optical angle-measuring instruments. More particularly, the invention pertains to a sextant, which includes a handle that is fastened to the body of a limbus.

2. Description of the Prior Art

Optical angle-measuring instruments, both sextants and octants, of the type wherein a handle is fastened to a limbus, serve primarily to determine position by measuring the angle between a remote object, such as a star, and the horizon which is locked onto via a transparent part of a horizon mirror. A precision measurement demands not only experience but also the user's steady hand. It would be desirable to be possible to optimize the user's instrument holding process by accounting for differing physiologies, handling habits and the like. However, in prior angle-measuring instruments of the aforesaid type, the handle is fixed onto the limbus body and in a definite position relative to it.

SUMMARY AND OBJECTS OF THE INVENTION

It is therefore the object of the invention to provide an optical measuring instrument wherein the user can adapt the handle position optimally to his individual wishes and habits when holding the instrument.

The present invention attains the foregoing and other objects by providing, in a first aspect, an improved sextant. Such sextant includes a handle that is attached to the body of a limbus. The pivot point of the handle lies in the center of an alhidade bearing of the limbus body. At least one fixing screw is provided for attaching the handle to the limbus body. The fixing screw is arranged so that it can be loosened for handle adjustment to permit pivotal movement between the handle and the limbus body.

In a second aspect the improved sextant includes a handle that is attached to the body of a limbus. Means are provided for permitting pivotal movement between the handle and the limbus body, such means including (i) a substantially circular head part, an end of the handle being fixed thereto, (ii) a substantially circular adapter plate that is fixed to an alhidade bearing, (iii) the head part and the adapter plate being concentrically arranged and (iv) means for fixing the orientation of the adapter plate relative to the head part through a predetermined angular continuum.

The foregoing and additional features and advantages of the present invention will become further apparent from the detailed description that follows. This description is accompanied by a set of drawing figures wherein numerals, corresponding to those of the written description, point to the features of the invention, like numerals corresponding to like features throughout.

DETAILED DESCRIPTION

Figure 1:
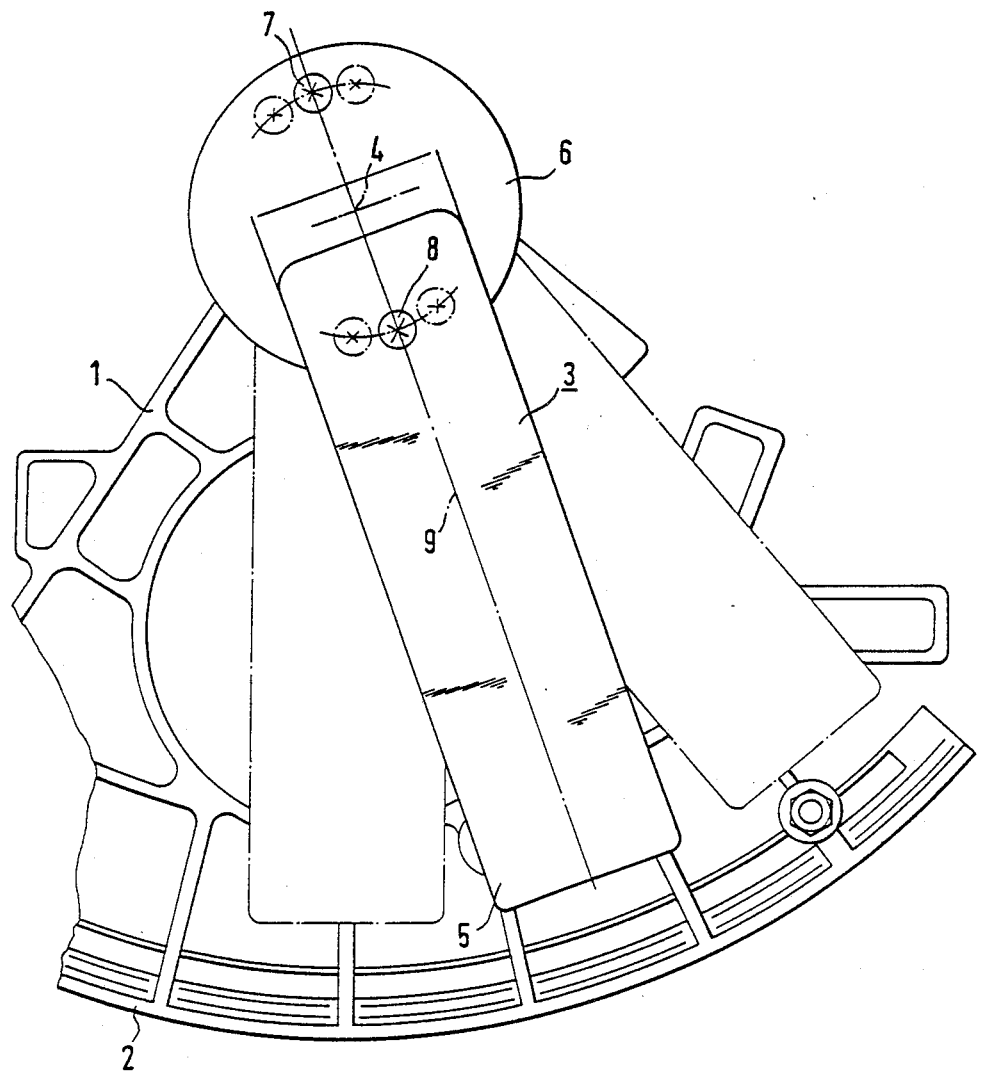
FIG. 1 is a partial side elevation view of a sextant in accordance with the invention as seen from the side facing away from the alhidade.

Turning now to the drawings, FIG. 1 is a partial side elevation view of a sextant in accordance with the invention as seen from the side facing away from the alhidade (not shown). A handle 3 is attached to the body 1 of a limbus 2 on the side that faces away from the alhidade. The handle 3 is pivotable through an angular range of, for example, forty (40°) degrees relative to the limbus body 1.

In accordance with the preferred emdodiment of the invention as shown in FIG. 1, a preferably integrally fitted, widened and (preferably) circularly-shaped head part 6 is provided for the handle 3 in the region of its fitting and remote from its free end 5. The handle 3 is fixed in the region of the head part 6 by means of screws 7, 8 that pass through corresponding bore holes in the head part 6 of the handle 3. The screws 7, 8 are arranged equi-distant from the center 4 of the alhidade bearing and on the longitudinal axis 9 of the handle 3 so that the handle 3 is fixed in a centered manner onto the center 4 of the alhidade bearing. Such an arrangement of fixing screws 7, 8 permits the handle 3 to be completely stress-free and connected in a centered manner with respect to the limbus body 1.

Figure 2:
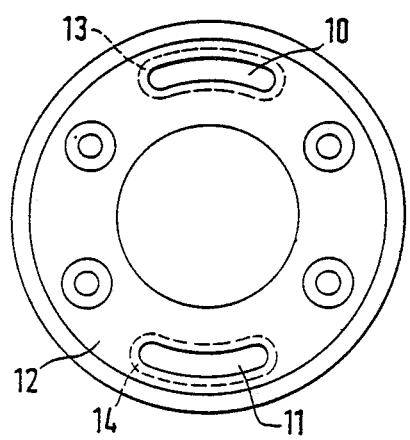
FIG. 2 is a side elevation view of a handle adjustment for fixing onto the limbus body.

FIG. 2 is a side elevation view of an adapter plate 12 for the handle adjustment which is fixed to the limbus body. The adapter plate 12 includes two circularly bent slots 10, 11 through which the abovementioned fixing screws pass. The plate 12 is fixed by means of four screws in a centered manner onto the alhidade bearing on the side of the alhidade on the limbus body 1. Grooves 13, 14 are milled into the rear of the plate 12 in the regions of the slots 10 and 11 respectively. The widths of the grooves correspond to the widths of the flat portions of hexagonal nuts (not shown) into which the fixing screws 7, 8 are fixed.

In operation, when the handle 3 is to be pivoted with respect to the limbus body 1 to another, more comfortable position for the user, the fixing screws 7, 8 are first loosened (e.g. by conterclockwise turns through about ninety degrees.) Thereafter, the handle 3 is pivoted relative to the limbus body and the fixing screws 7, 8 are again tightened. The two possible extreme positions of the handle 3 are illustrated in broken lines in FIG. 1. The continuous pivoting capability of the handle 3 is, as shown, about forty degrees permitting the setting of all practical handle positions.

Thus it can be seen that the present invention provides an optical measuring instrument that permits the user to adapt the handle position optimally to his individual wishes and habits while holding the instrument. By employing the invention, the comfortable handling of an optical hand-held angle-measuring instrument, such as a sextant, is improved.

While the invention has been disclosed with reference to its presently-preferred embodiment, it is not limited thereto. Rather the invention is limited only insofar as defined by the following set of claims and includes all equivalents thereof.

What is claimed is:

1. A sextant comprising, in combination:
   (a) a handle, said handle being attached to the body of a limbus, the pivot point of said handle lying in the center of an alhidade bearing of said limbus body;
   (b) at least one fixing screw for attaching said handle to the body of said limbus;

(c) said at least one fixing screw is arranged so that it can be loosened for handle adjustment to permit pivotal movement between said handle and said limbus body.

2. A sextant as defined in claim 1 further including:
 (a) at least two fixing screws;
 (b) said fixing screws pass through bore holes lying equidistant from said alhidade bearing in the longitudinal axis of said handle;
 (c) each of said fixing screws passes through a bent slot in an adapter plate fixed to said limbus body; and
 (d) nuts arranged on the side of said alhidade engage said screws.

3. A sextant comprising, in combination:
 (a) a handle;
 (b) said handle being attached to the body of a limbus; and
 (c) means for permitting pivotal movement between said handle and said limbus body, said means including (i) a substantially circular head part, an end of said handle being fixed to said head part, (ii) a substantially circular adapter plate, said plate being fixed to an alhidade bearing, (iii) said head part and said adapter plate being concentrically arranged and (iv) means for fixing the orientation of said adapter plate relative to said head part through a predetermined angular continuum.

4. A sextant as defined in claim 3 wherein said means for fixing is further characterized as follows:
 (a) said adapter plate has at least one circularly bent slot;
 (b) at least one screw is fixed to said head part and adapted to be received in said slot; and
 (c) a nut, said nut being threadedly engaged to said screw.

5. A sextant defined in claim 4 further characterized in that said head part is concentric with said alhidade bearing.

6. A sextant as defined in claim 5 wherein said slot includes a grooved edge for accommodating said nut.

7. A sextant as defined in claim 6 further characterized in that said means for fixing is arranged so that the position of said handle is substantially adjustable through forty degrees.

8. A sextant as defined in claim 7 further characterized in that:
 (a) said adapter plate has two symmetrically arranged slots;
 (b) a pair or screws is fixed to said head part, each of said screws being arranged to be received in one of said slots; and
 (c) a pair of nuts, each of said nuts being threadedly engaged to one of said screws.

* * * * *